(12) United States Patent
Chen

(10) Patent No.: US 8,918,388 B1
(45) Date of Patent: Dec. 23, 2014

(54) CUSTOM DATA WAREHOUSE ON TOP OF MAPREDUCE

(75) Inventor: Songting Chen, San Jose, CA (US)

(73) Assignee: Turn Inc., Redwood City, CA (US)

(*) Notice: Subject to any disclaimer, the term of this patent is extended or adjusted under 35 U.S.C. 154(b) by 393 days.

(21) Appl. No.: 12/751,847

(22) Filed: Mar. 31, 2010

Related U.S. Application Data

(60) Provisional application No. 61/308,800, filed on Feb. 26, 2010.

(51) Int. Cl.
*G06F 17/30* (2006.01)

(52) U.S. Cl.
USPC ............ 707/714; 707/715; 707/716; 707/717

(58) Field of Classification Search
CPC ................................. G06F 17/30; G06F 17/00
See application file for complete search history.

(56) References Cited

U.S. PATENT DOCUMENTS

| | | | | |
|---|---|---|---|---|
| 5,423,037 A * | 6/1995 | Hvasshovd | ............................ | 1/1 |
| 5,802,523 A * | 9/1998 | Jasuja et al. | ............................ | 1/1 |
| 5,893,104 A * | 4/1999 | Srinivasan et al. | ...................... | 1/1 |
| 5,926,809 A * | 7/1999 | Szalwinski | ............................ | 1/1 |
| 5,991,754 A * | 11/1999 | Raitto et al. | ............................ | 1/1 |
| 6,144,957 A * | 11/2000 | Cohen et al. | ............................ | 1/1 |
| 6,321,218 B1 * | 11/2001 | Guay et al. | ............................ | 1/1 |
| 6,496,819 B1 * | 12/2002 | Bello et al. | ............................ | 1/1 |
| 6,502,093 B1 * | 12/2002 | Bhatt et al. | ............................ | 1/1 |
| 6,509,828 B2 * | 1/2003 | Bolavage et al. | ............ | 340/10.1 |
| 6,546,382 B1 * | 4/2003 | Amor et al. | ............................ | 1/1 |
| 6,578,037 B1 * | 6/2003 | Wong et al. | ................... | 707/694 |
| 6,631,371 B1 * | 10/2003 | Lei et al. | ........................ | 707/694 |
| 6,636,870 B2 * | 10/2003 | Roccaforte | ............................ | 1/1 |
| 6,684,203 B1 * | 1/2004 | Waddington et al. | ......... | 707/714 |
| 6,775,662 B1 * | 8/2004 | Witkowski et al. | ..................... | 1/1 |
| 6,775,681 B1 * | 8/2004 | Ballamkonda et al. | ........ | 707/718 |
| 6,829,600 B2 * | 12/2004 | Gu et al. | ........................ | 707/809 |
| 7,103,611 B2 * | 9/2006 | Murthy et al. | ........................ | 1/1 |
| 7,120,645 B2 * | 10/2006 | Manikutty et al. | ..................... | 1/1 |
| 7,120,776 B2 * | 10/2006 | Rajamani et al. | ............. | 711/170 |
| 7,127,467 B2 * | 10/2006 | Yalamanchi et al. | .................. | 1/1 |
| 7,133,876 B2 * | 11/2006 | Roussopoulos et al. | ....... | 707/752 |
| 7,228,300 B2 * | 6/2007 | Lei et al. | ........................ | 707/694 |
| 7,523,123 B2 * | 4/2009 | Yang et al. | ............................ | 1/1 |
| 7,571,174 B2 * | 8/2009 | Arumainayagam et al. | .......... | 1/1 |

(Continued)

OTHER PUBLICATIONS

Yang, Hung-Chih, et al., "Map-Reduce-Merge: Simplified Relational Data Processing on Large Clusters," pp. 1029-1040, AMC, SIGMOD '07, Jun. 12-14, 2007.*

(Continued)

*Primary Examiner* — Farhan Syed
(74) *Attorney, Agent, or Firm* — Michael A. Glenn; Perkins Coie LLP

(57) ABSTRACT

A method and apparatus for a data warehouse built on top of MapReduce is provided. A virtual view is defined on top of the common star or snowflake data warehouse schema. A SQL-like, but much more succinct, query language is provided to leverage the virtual view. Many advanced query processing features leveraging the virtual view are also provided. Further, several optimization techniques ranging from data compression and access method to multi-query optimization and exploiting materialized views are provided. Further, a technique to seamlessly integrate the data warehouse system into any ad-hoc MapReduce jobs is provided. Thus, fully leveraging the power of both MapReduce and data warehouse technologies is achieved.

18 Claims, 10 Drawing Sheets

(56) References Cited

U.S. PATENT DOCUMENTS

| | | | |
|---|---|---|---|
| 8,112,758 B2* | 2/2012 | Jain et al. | 718/104 |
| 8,239,847 B2* | 8/2012 | Yu et al. | 717/149 |
| 8,374,894 B2* | 2/2013 | Weinstock et al. | 705/5 |
| 8,401,881 B2* | 3/2013 | Weinstock et al. | 705/6 |
| 8,429,630 B2* | 4/2013 | Nickolov et al. | 717/148 |
| 8,452,763 B1* | 5/2013 | Pasca | 707/727 |
| 8,584,013 B1* | 11/2013 | Tveit | 715/700 |
| 2003/0055832 A1* | 3/2003 | Roccaforte | 707/100 |
| 2003/0126143 A1* | 7/2003 | Roussopoulos et al. | 707/100 |
| 2008/0098370 A1* | 4/2008 | Fontoura et al. | 717/139 |
| 2008/0120314 A1* | 5/2008 | Yang et al. | 707/101 |
| 2008/0250227 A1* | 10/2008 | Linderman et al. | 712/32 |
| 2008/0270363 A1* | 10/2008 | Hunt et al. | 707/3 |
| 2008/0288522 A1* | 11/2008 | Hunt et al. | 707/101 |
| 2008/0294996 A1* | 11/2008 | Hunt et al. | 715/739 |
| 2009/0006156 A1* | 1/2009 | Hunt et al. | 705/7 |
| 2009/0006309 A1* | 1/2009 | Hunt et al. | 707/1 |
| 2009/0018996 A1* | 1/2009 | Hunt et al. | 707/2 |
| 2009/0178046 A1* | 7/2009 | Jain et al. | 718/104 |
| 2010/0115046 A1* | 5/2010 | Reddy Byreddy et al. | 709/208 |
| 2010/0174754 A1* | 7/2010 | B'Far et al. | 707/794 |
| 2010/0218037 A1* | 8/2010 | Swartz et al. | 714/6 |
| 2010/0218134 A1* | 8/2010 | B'Far et al. | 715/780 |
| 2010/0223244 A1* | 9/2010 | Sinha et al. | 707/705 |
| 2010/0241828 A1* | 9/2010 | Yu et al. | 712/30 |
| 2010/0281078 A1* | 11/2010 | Wang et al. | 707/812 |
| 2011/0044354 A1* | 2/2011 | Wei | 370/468 |
| 2011/0047172 A1* | 2/2011 | Chen et al. | 707/764 |
| 2011/0093430 A1* | 4/2011 | B'Far et al. | 706/55 |
| 2011/0137924 A1* | 6/2011 | Hunt et al. | 707/757 |
| 2011/0154339 A1* | 6/2011 | Lee et al. | 718/100 |
| 2011/0162069 A1* | 6/2011 | Aupperle et al. | 726/22 |
| 2011/0167149 A1* | 7/2011 | Lee et al. | 709/224 |
| 2011/0173410 A1* | 7/2011 | Castillo et al. | 711/170 |
| 2011/0179100 A1* | 7/2011 | Kawai | 709/201 |
| 2011/0191361 A1* | 8/2011 | Gupta et al. | 707/763 |
| 2011/0208947 A1* | 8/2011 | Lin et al. | 712/28 |
| 2011/0258049 A1* | 10/2011 | Ramer et al. | 705/14.66 |
| 2011/0276789 A1* | 11/2011 | Chambers et al. | 712/220 |
| 2011/0276962 A1* | 11/2011 | Chambers et al. | 718/1 |
| 2011/0295855 A1* | 12/2011 | Wang et al. | 707/737 |
| 2011/0302151 A1* | 12/2011 | Abadi et al. | 707/714 |
| 2011/0302226 A1* | 12/2011 | Abadi et al. | 707/825 |
| 2011/0302583 A1* | 12/2011 | Abadi et al. | 718/102 |
| 2012/0016810 A1* | 1/2012 | Yanase et al. | 706/10 |
| 2012/0042319 A1* | 2/2012 | Hildrum et al. | 718/104 |
| 2012/0110047 A1* | 5/2012 | Hildrum et al. | 708/104 |
| 2012/0130659 A1* | 5/2012 | Chaves | 702/62 |
| 2012/0166447 A1* | 6/2012 | Nice et al. | 707/746 |
| 2012/0173515 A1* | 7/2012 | Jeong et al. | 707/718 |
| 2012/0209705 A1* | 8/2012 | Ramer et al. | 705/14.51 |
| 2012/0209706 A1* | 8/2012 | Ramer et al. | 705/14.51 |
| 2012/0209707 A1* | 8/2012 | Ramer et al. | 705/14.51 |
| 2012/0209708 A1* | 8/2012 | Ramer et al. | 705/14.51 |
| 2012/0209709 A1* | 8/2012 | Ramer et al. | 705/14.51 |
| 2012/0209710 A1* | 8/2012 | Ramer et al. | 705/14.51 |
| 2012/0215602 A1* | 8/2012 | Ramer et al. | 705/14.13 |
| 2012/0215612 A1* | 8/2012 | Ramer et al. | 705/14.23 |
| 2012/0215622 A1* | 8/2012 | Ramer et al. | 705/14.44 |
| 2012/0215623 A1* | 8/2012 | Ramer et al. | 705/14.44 |
| 2012/0215624 A1* | 8/2012 | Ramer et al. | 705/14.44 |
| 2012/0215625 A1* | 8/2012 | Ramer et al. | 705/14.44 |
| 2012/0215626 A1* | 8/2012 | Ramer et al. | 705/14.44 |
| 2012/0215635 A1* | 8/2012 | Ramer et al. | 705/14.51 |
| 2012/0215639 A1* | 8/2012 | Ramer et al. | 705/14.53 |
| 2012/0215640 A1* | 8/2012 | Ramer et al. | 705/14.55 |

OTHER PUBLICATIONS

Chen, Songting, "Cheetah: A High Performance, Custom Data Warehouse on Top of MapReduce," Sep. 13-17, 2010, ACM, Proceedings of the VLDB Endowment, vol. 3, No. 2, pp. 1459-1468 (10 total pages).*

Dean, Jeffrey, et al., "MapReduce: simplified data processing on large clusters," Jan. 2008, ACM, Communications of the ACM, vol. 51, Issue 1, pp. 107-113 (7 total pages).*

Gates, A. F., Natkovich, O., Chopra, S., Kamath, P., Narayanamurthy, S. M., Olston, C., . . . & Srivastava, U. (2009). Building a high-level dataflow system on top of Map-Reduce: the Pig experience. Proceedings of the VLDB Endowment, 2(2), 1414-1425 (12 total pages).*

Abadi, et al., "Integrating Compression and Execution in Column-Oriented Database Systems", SIGMOD 2006, Chicago, Illinois, USA, Jun. 27-29, 2006, 12 pages.

Abouzeid, et al., "HadoopDB: An Architectural Hybrid of MapReduce and DBMS Technologies for Analytical Workloads", VLDB '09, Lyon, France, Aug. 24-28, 2009, 12 pages.

Ailamaki, et al., "Weaving Relations for Cache Performance", Proceedings of the 27th VLDB Conference, Roma, Italy, Sep. 11-14, 2001, 12 pages.

Chang, et al., "Bigtable: A Distributed Storage System for Structured Data", OSDI 2006, Seattle, Washington, USA, Nov. 6-8, 2006, 14 pages.

Dean, et al., "MapReduce: Simplified Data Processing on Large Clusters", OSDI 2004, San Francisco, California, USA, Dec. 5, 2004, pp. 137-150.

Gates, et al., "Building a High-Level Dataflow System on top of Map-Reduce: The Pig Experience", VLDB '09, Lyon, France, Aug. 24-28, 2009, 12 pages.

Graefe, et al., "Data Compression and Database Performance", Proceedings of ACM/IEEE-CS Symp. on Applied Computing, Kansas City, Missouri, USA, Apr. 1991, 10 pages.

Halevy, A.Y. , "Answering queries using views: A survey", The VLDB Journal 10, Sep. 6, 2001, 270-294.

Raman, et al., "How to Wring a Table Dry: Entropy Compression of Relations and Querying of Compressed Relations", VLDB '06, Seoul, Korea, Sep. 12-15, 2006, pp. 858-869.

Sweeney, Latanya , "k-Anonymity: A Model for Protecting Privacy", Int'l Journal on Uncertainty, Fuzziness and Knowledge-based Systems, 10 (5), Oct. 2002, pp. 557-570.

Thusoo, et al., "Hive—A Warehousing Solution Over a Map-Reduce Framework", VLDB '09, Lyon, France, Aug. 24-28, 2009, 4 pages.

Wang, et al., "On the Correctness Criteria of Fine-Grained Access Control in Relational Databases", VLDB '07, Vienna, Austria, Sep. 23-28, 2007, pp. 555-566.

Yang, et al., "Map-Reduce-Merge: Simplified Relational Data Processing on Large Clusters", SIGMOD '07, Beijing, China, Jun. 12-14, 2007, pp. 1029-1040.

* cited by examiner

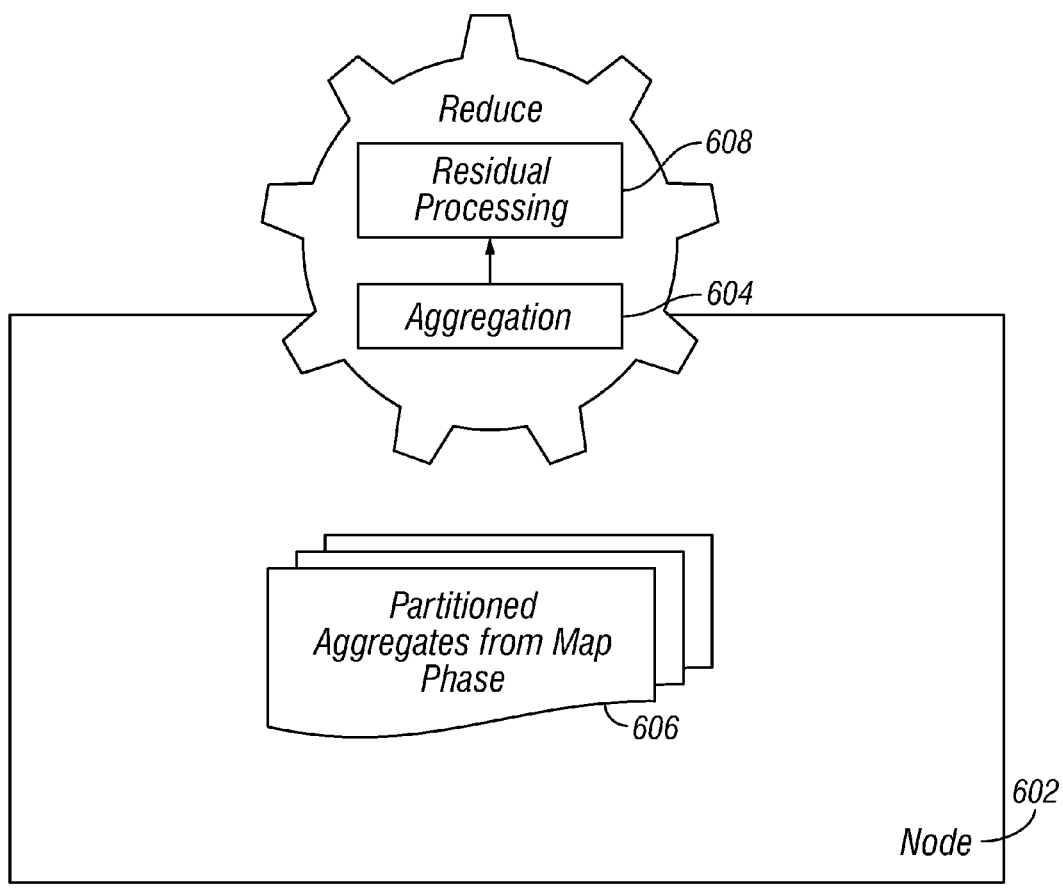

CUSTOM DATA WAREHOUSE ON TOP OF MAPREDUCE

CROSS REFERENCE TO RELATED APPLICATIONS

This patent application claims the benefit of U.S. provisional patent application Ser. No. 61/308,800, A Custom Data Warehouse on top of MapReduce, filed Feb. 26, 2010, the entirety of which is incorporated herein by this reference thereto.

BACKGROUND OF THE INVENTION

1. Technical Field

This invention relates generally to a data warehouse framework. More specifically, this invention relates to a data warehouse built on top of MapReduce.

2. Description of the Related Art

MapReduce is a programming model that performs parallel analysis on large data sets as introduced by J. Dean and S. Ghemawat, *MapReduce: Simplified Data Processing on Large Clusters*, Proceedings of OSDI, page 10, 2004. The input to an analysis job is a list of key-value pairs. Each job contains two phases, namely, the map phase and the reduce phase.

The map phase executes a user-defined map function, which transforms the input key-value pairs into a list of intermediate key-value pairs.

map(k1,v1)→list(k2,v2)

The MapReduce framework then partitions these intermediate results based on key and sends them to the nodes that perform the reduce function. The user-defined reduce function is called for each distinct key and a list of values for that key to produce the final results.

reduce(k2, list(v2))→(k3, v3)

The optional combiner function is quite similar to reduce function, which is to pre-aggregate the map output so as to reduce the amount of data to be transferred across the network. Many real world data processing jobs can be converted into MapReduce programs using these two simple primitives, such as search engine and machine learning.

While a MapReduce system is fairly flexible and scalable, users have to spend a lot of effort writing a MapReduce program due to lack of a declarative query interface. Also since MapReduce is just an execution model, the underlying data storage and access method are completely left to users to implement. While this certainly provides some flexibility, it also misses some optimization opportunity if the data has some structure in it. Relational databases have addressed the above issues for a long time: they have a declarative query language, i.e. SQL. The storage and data access may be highly optimized as well.

SUMMARY OF THE INVENTION

A method and apparatus for a data warehouse built on top of MapReduce is provided. A virtual view is defined on top of the common star or snowflake data warehouse schema. A SQL-like, but much more succinct, query language is provided to leverage the virtual view. Many advanced query processing features leveraging the virtual view are also provided. Further, several optimization techniques ranging from data compression and access method to multi-query optimization and exploiting materialized views are provided. Further, a technique to seamlessly integrate the data warehouse system into any ad-hoc MapReduce jobs is provided. Thus, fully leveraging the power of both MapReduce and data warehouse technologies is achieved.

BRIEF DESCRIPTION OF THE DRAWINGS

FIG. 5 is a schematic diagram of a scanner interface according to an embodiment;

FIG. 6 is a schematic diagram of the reduce phase of the query according to an embodiment;

DETAILED DESCRIPTION OF THE INVENTION

Overview

A method and apparatus for a data warehouse built on top of MapReduce is provided. A virtual view is defined on top of the common star or snowflake data warehouse schema. A SQL-like, but much more succinct, query language is provided to leverage the virtual view. Many advanced query processing features leveraging the virtual view are also provided. Further, several optimization techniques ranging from data compression and access method to multi-query optimization and exploiting materialized views are provided. Further, a technique to seamlessly integrate the data warehouse system into any ad-hoc MapReduce jobs is provided. Thus, fully leveraging the power of both MapReduce and data warehouse technologies is achieved.

Schema Design, Query Language

Virtual View Over Warehouse Schema

Figure 1:
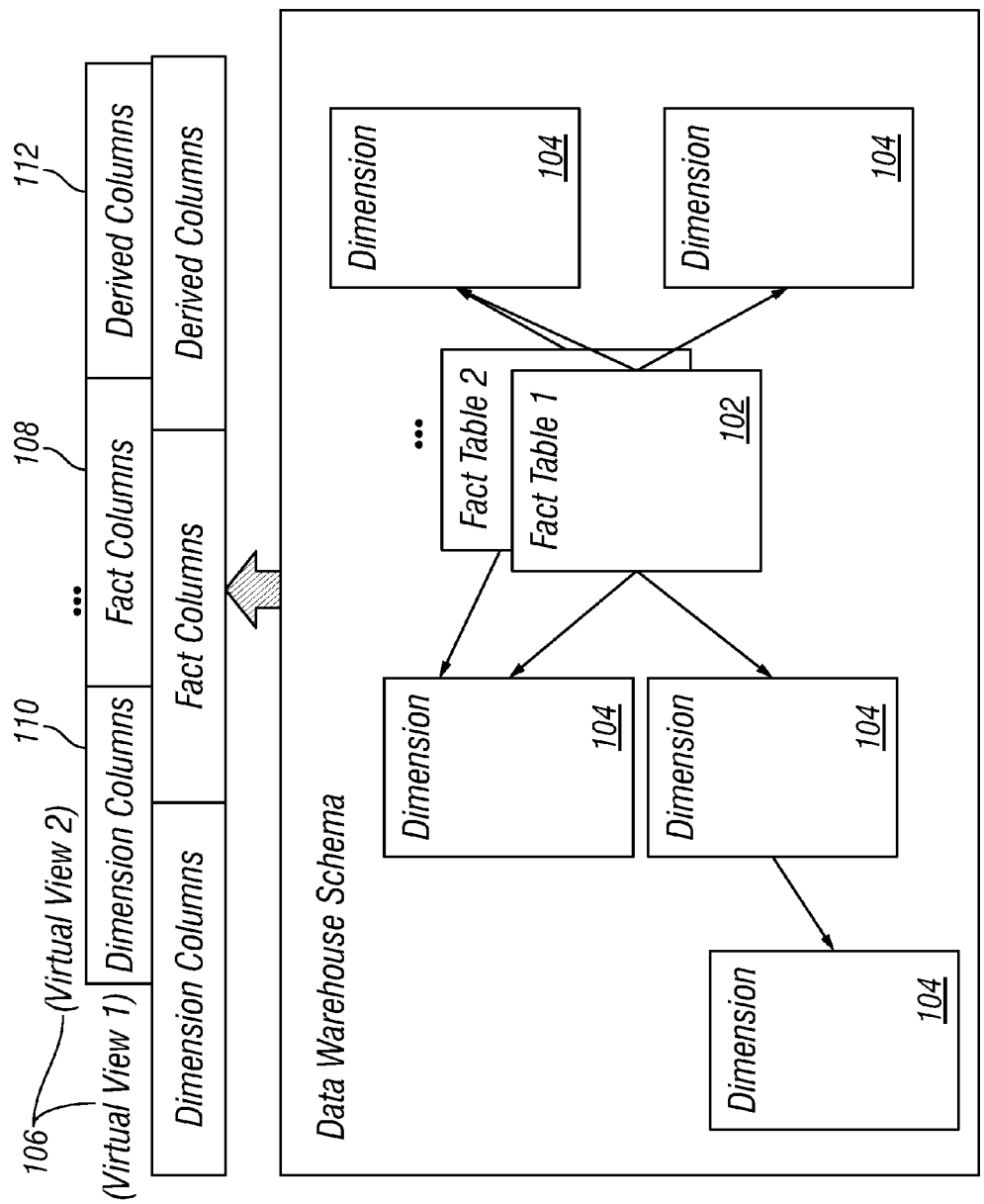
FIG. 1 is a schematic diagram showing a central fact table connected by a number of dimension tables and virtual views according to an embodiment.

Star or snowflake schema may be a common data warehouse design. As shown in FIG. 1, the central fact table 102 is connected by a number of dimension tables 104 through, typically, a key and foreign key relationship. Note that such relationship is often stable as a join would only make sense between a key and its corresponding foreign key. Based on this observation, in an embodiment a virtual view is defined on top of the star or snow-flake schema, which essentially joins the fact table with all its related dimension tables. As can be seen in FIG. 1, virtual views 106 may contain attributes from fact tables 108, dimension tables 110, and columns 112 derived therefrom.

It should be appreciated that virtual design is a central piece of the discussion herein. For example, suppose the following tables contain the following columns (in parentheses):

Fact table (advertiser_id, publisher_id, ... )
Dimension 1 (advertiser_id, advertiser_name, ... )
Dimension 2 (publisher_id, publisher_name, ... ).

Thus, in an embodiment, a virtual view can join this fact table with both Dimension 1 and Dimension 2 by their respective IDs and include all the respective attributes. Defining such a view in current relational database systems is not done because such databases do not provide any technique for optimizing the query against this virtual view. For example, if the view is joining 20 dimensions, even when the query requires joining just one dimension, a typical current database still joins all 20 dimensions. Thus, the use of virtual view is not seen in practice at all.

These virtual views are exposed to the users for query. At runtime, only the tables that the query referred to are accessed and joined. This abstraction greatly simplifies the query language as described in detail hereinbelow. As a result, users no longer have to understand the underlying schema design before they can issue any query. They can also avoid writing many join predicates repetitively. Note that there may be multiple fact tables and subsequently multiple virtual views. Hereinbelow, we describe in further detail the semantics when querying more than one virtual view.

In an embodiment, the fact table may have a nested relational data model. As a simple example, a single user may have different types of events, where each of them is modeled as a nested table. Similarly, a nested relational virtual view may be defined on top of the nested table by joining each nested table with all its related dimensions. An embodiment also includes a design of a query language that is much simpler than the standard nested relational query and is discussed in further detail hereinbelow.

Handle Big Dimension Tables

It has been found that, unlike the filtering, grouping and aggregation operators, the implementation of a JOIN operator on top of MapReduce may not be as straight-forward.

It is known that there are two ways to implement the JOIN operator, namely, either at the map phase or at the reduce phase. The implementation at the reduce phase may be more general and applicable to all scenarios. Basically, it partitions the input tables on the join column at the map phase. The actual join is performed at the reduce phase for each partition. Obviously, when the input tables are big, such approach may result in massive data redistribution.

In an embodiment, the implementation at the map phase is applicable when one of the join tables is small or the input tables are already partitioned on the join column. For the first case, the small table can be loaded into memory and a hash-lookup can be performed while scanning the other big table during the map phase. Such technique can be generalized to multi-way join if there are m small tables to be joined with one big table. For the second case, the map phase can read the same partitions from both tables and perform the join.

It has been found that the current implementation of HaDoop®, The Apache™ Software Foundation ("HaDoop"), which is a framework that allows for the distributed processing of large data sets across clusters of computers using simple programming models, lacks some features including that there is no facility in HaDoop File System (HDFS) to force two data blocks with the same partition key to be stored on the same node. As such, one of the join tables still has to be transferred over the network, which is a significant cost for big table. Hence, while it may be difficult to do co-located join in HaDoop at this point in time, such co-located join is contemplated herein, according to an embodiment.

Based on this observation, an embodiment includes denormalizing big dimension tables. That is, dimension attributes of a big table are directly stored into the fact table. One example is storing URL data as additional attributes in the fact table instead of creating a huge URL dimension. It has been found that this approach works well when the dimension table is either insertion-only or is a slowly changing dimension, and the queries require seeing the snapshot of dimension attributes at the time of event. In an embodiment, most big dimension tables and queries have the above semantics.

Handle Schema Changes

Frequent schema changes may often pose significant challenges to relational databases, especially when the changes are on the huge fact tables. In an embodiment, a schema versioned table is allowed to efficiently support schema changes on the fact table. In particular, each fact table row contains a schema version ID. The metadata store records the columns that are available for that version. This way, adding or removing columns becomes straightforward without touching any prior data.

Query Language

The data warehouse, according to an embodiment, focuses on supporting the most common data warehouse queries, e.g. star joins and aggregations. An embodiment includes efficient query processing and optimization and also a succinct query language that is a lot easier than the standard SQL for users to understand and write queries.

In an embodiment, single block, SQL-like queries are supported. A description of the query syntax according to the embodiment is shown below via a sample query.

SELECT advertiser_name,
 sum(impression), sum(click), sum(cost)
FROM Impressions_v, Clicks_v
DATES [2010_01_01, 2010_01_15], [2010_02_01, 2010_02_15]
WHERE site in ('cnn.com','foxnews.com')
[GROUP BY advertiser_name]

First, by default, the fact tables are partitioned by date. Thus, an embodiment provides an explicit DATES clause to make it easier for users to specify interested date ranges. Next, the FROM clause may include one or more virtual views. When there is only one virtual view, its semantics is straightforward. When there are two or more virtual views in the FROM clause, its semantics is defined as follows: Union all the rows from each individual virtual view. If a specific column referred to in the query does not exist in the view, treat it as a NULL value. To have meaningful query semantics, all group by columns are required to exist in each of the views in the FROM clause. It should be appreciated that such union semantics still allow the query to be executable parallel-wise.

In the above example, advertiser_name is a dimension attribute through join on the ID column. Both virtual views, namely, Impressions_v and Clicks_v, contain that column. The impression column only exists in the Impressions_v view, the click column only exists in the Clicks_v view, while cost column exists in both views. Finally, the SELECT, WHERE, GROUP BY clauses have the same semantics as standard SQL. As a simplification, the GROUP BY clause may be omitted. Then, all non-aggregate columns in the SELECT clause are treated as GROUP BY columns. An embodiment supports most arithmetic operations and case, in, statement, etc.

It should further be appreciated that this query language is fairly simple in that users do not have to understand the underlying schema design, nor do they have to repetitively write any join predicates. It has been found that users with no prior SQL knowledge are able to quickly grasp this language.

Multi-Block Query

An embodiment also supports CREATE TABLE AS (CTAS) statement. To answer a multi-block non-correlated query, a user can first create a table and then query over the result table.

Security and Anonymity

An embodiment supports row level security based on virtual views. For a given user, an embodiment may restrict the columns that a user may query. It may also automatically add some additional predicates to remove those rows that should not be accessed by that user. The predicates can be defined on any of the dimension attributes, fact table attributes or derived attributes. Thus, the system may join a dimension table for access control purposes even when the user query does not refer to it at all.

An embodiment also provides ways to anonymize data, through the definition and use of user-dependent derived attributes in the virtual views. For example, for a given user, a derived attribute can be defined as a case expression over a fact table attribute, which returns a default value under certain conditions. For a different user, the definition of this derived attribute can be completely different. Similarly, joins can be included automatically for the purpose of anonymizing data.

It should be appreciated that such virtual view based approach makes these fine-grained access control mechanisms fairly easy to define and fairly easy to implement for a user.

Metadata

In an embodiment, a metadata store records the table definition, versioned schema information, user and security information, etc. It is replicated to all nodes in the cluster and synchronized with a master node.

Architecture

In this section, an overview of a data warehouse system according to one or more embodiments is provided. In particular, in an embodiment, the system is designed to accomplish the following two goals.

Simple yet efficient: The core query engine is able to efficiently process the common data warehouse queries, e.g. star joins and aggregations, as discussed hereinabove.

Open: It should also provide a simple, non-SQL interface to allow ad-hoc MapReduce programs to directly access the raw data.

Figure 2:
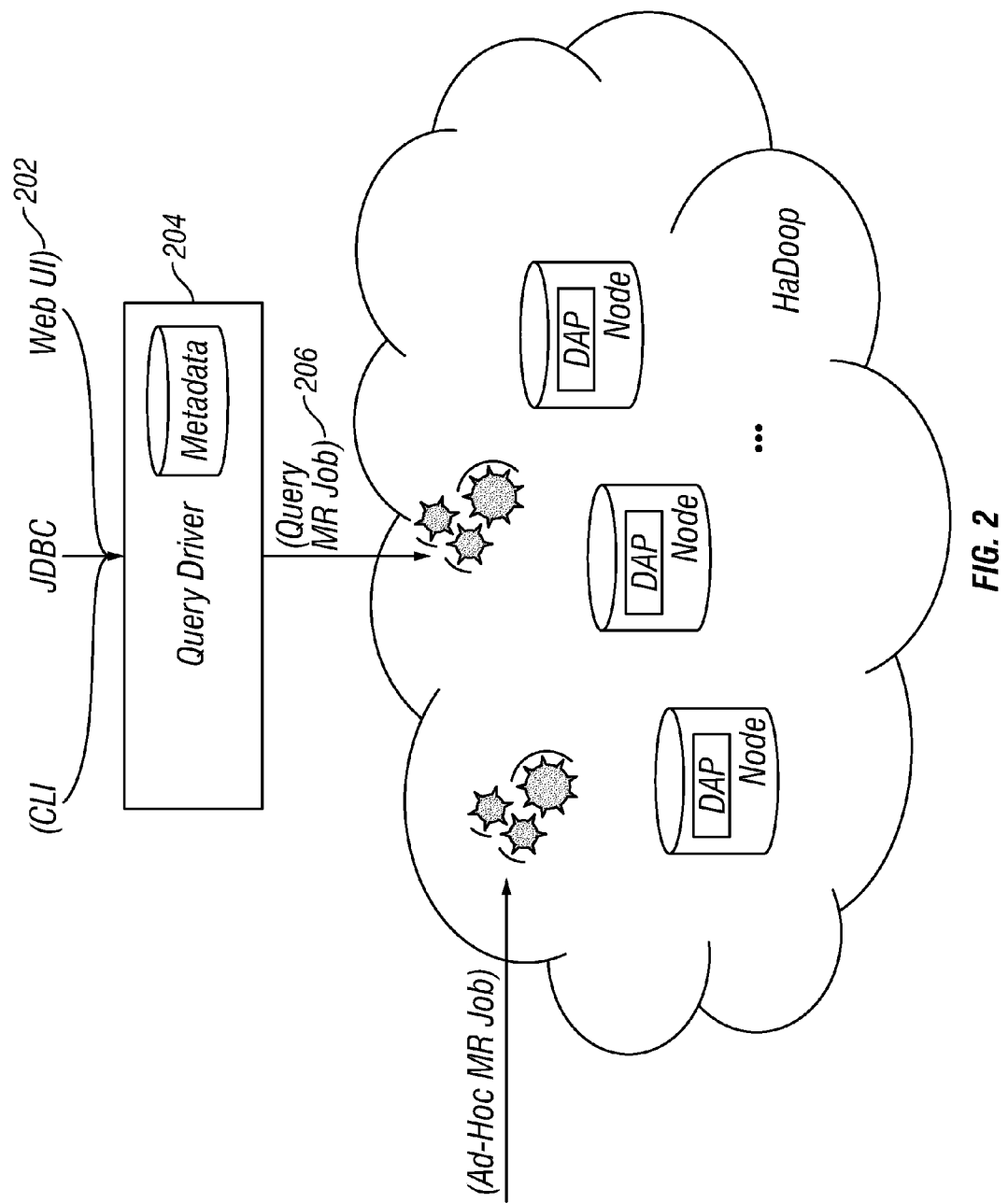
FIG. 2 is a schematic diagram that depicts an architecture of a data warehouse system according to an embodiment.

FIG. 2 depicts an architecture of a data warehouse system according to an embodiment. Referring to FIG. 2, a user can issue a query through either Web UI, or command line interface (CLI), or Java code via JDBC™ API ("JDBC") 202. The query is sent to the node that runs the Query Driver 204. The main task for Query Driver 204 is to translate the query to a MapReduce job 206, which includes the map phase plan and the reduce phase plan.

Several possible optimizations are considered during this query translation phase. For example, the query translation needs to configure the query MapReduce job by setting a proper number of reducers. Such translation may also decide to batch process multiple user queries if such queries are sharable or to use a pre-defined materialized view if such view matches a particular query. As for query execution, each node in the HaDoop cluster provides a data access primitive (DAP) interface, which essentially is a scanner over virtual views. The query MapReduce job utilizes this scanner, which performs the Select-Project-Join (SPJ) portion of the query. The ad-hoc MapReduce job can issue a similar API call for fine-grained data access as well.

Data Storage and Compression

Storage Format

An embodiment may employ from several methods for storing tabular data, namely, for example, text (e.g. in comma delimited format or CSV format), serialized java object, row-based binary array, and columnar binary array.

Text is the simplest storage format and is commonly used in web access logs. A java class can implement the serialization method to write its members to a binary output stream, and implement the de-serialization method to read from a binary input stream to reconstruct the java object. Row-based binary array is commonly used in row-oriented database systems, where each row is de-serialized into a binary array, which is then written and read as a whole. In the case of read, only interested columns are extracted from the binary array for further processing.

The above three methods conceptually correspond to a row-oriented store. Columnar binary array conceptually is a hybrid of row-column store. That is, n rows are stored in one cell. Within one cell, the values of the same column are stored together as a column set. As is shown hereinbelow, storage format has a huge impact on both compression ratio and query performance. In an embodiment, data is stored in columnar format whenever possible.

Columnar Compression

It has been found that column-oriented databases have shown great potential especially for data compression. The intuition is that the values of the same column are more likely to be similar to each other. Hence the increasing similarity of adjacent data offers better compression opportunity.

Figure 3:
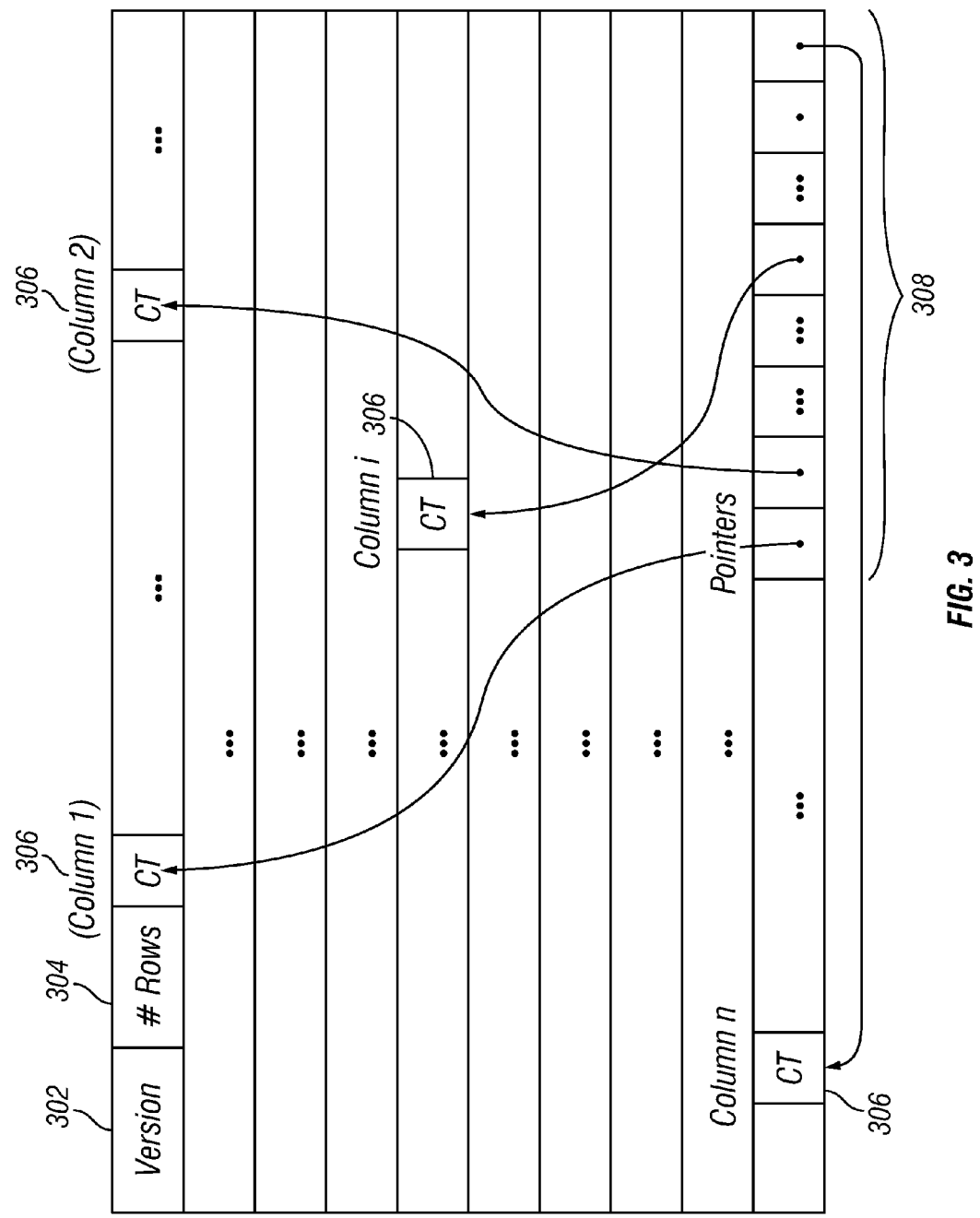
FIG. 3 is a schematic diagram that depicts a storage format of a single cell according to an embodiment.

FIG. 3 depicts a storage format of a single cell according to an embodiment. The header includes the schema version 302 and the number of rows 304 in this cell. The data portion includes all of the column sets 306 and the pointers 308 to the beginning of each column set. Each column set starts with a compression flag (CT), which can be one of the following: dictionary encoding, common value encoding, run length encoding, or no compression.

Dictionary encoding may be considered perhaps the most commonly used database compression method. The basic idea is that if there are only 16 distinct values, only 4 bits are needed to store the column. Thus, such method may potentially offer quite big savings if the original column has a much bigger size.

Common value encoding is useful when the column is highly skewed towards a single value. Thus, each value is associated with an additional bit. The value needs to be stored only when that bit indicates that it is not the common one. This method can be considered as the simplest version of variable length encoding, where only the skew of the most common value is exploited. In an embodiment, the decision for this simplification is based on specific data characteristics and on the fact that the entire cell will be compressed using GNU zip (GZIP).

Run length encoding, which stores data as (value, length) pair, is useful when the column is sorted. Because not all columns can be sorted, an embodiment chooses to sort the largest column in the largest correlated column group. This way, more columns can potentially benefit from this compression method.

Lastly, no compression is sometimes the only option for such columns with very high cardinality.

In an embodiment, the choice of compression type for each column set is determined dynamically based on the data in each cell. During an extraction transform load (ETL) phase, the statistics of each column set is maintained and the best compression method is chosen. It has been found that a proper partition of a cell improves the compression ratio as well. After one cell is created, it is further compressed using GZIP. Put together, it has been found that eight times the compression ratio is achieved compared to when the data is stored in row-oriented binary array format.

In the case of decompression, the entire cell is first loaded into memory. Only those column sets that are referred to in the query are decoded through an iterator interface. An iterator interface, according to an embodiment, essentially gets one data item, processes the data item, and gets the next data item, iteratively. An example of pseudo-code implementation is as follows:

while (hasMoreData)
    process(getData( ));

Query Plan and Execution

In this section, it is shown how to translate the query to a HaDoop MapReduce job in accordance with an embodiment. To submit a HaDoop MapReduce job, first input files need to be specified. Such input files are stored on the HaDoop distributed file system (HDFS). Also, a query-specific map function and a reduce function need to be supplied.

Input Files

In an embodiment, the input files to the MapReduce job are fact tables. The HaDoop framework scans those fact table files in parallel. There is no need to specify any dimension tables as input. Such dimension tables are picked up automatically during the map phase.

As discussed above, in an embodiment, the fact tables are partitioned by date. The DATES clause helps to find or determine related partitions. In an embodiment, the fact tables are further partitioned by a dimension key attribute, referred as $D_{ID}$. A predicate on $D_{ID}$ in the query helps choose the right partition, which may significantly reduce amount of data to be processed. In an embodiment, functional dependency is further used or exploited to maximize the possibility of using this partition property. For example, assume a functional dependency $D'_A \rightarrow D_{ID}$ and a query predicate $D'_A = a$. By querying related dimensions, an additional predicate $D_{ID}=id$ can be added to the query. Because these dimensions are small, this additional cost is insignificant compared to the potential big performance gain.

Map Phase Plan

A Map phase plan according to an embodiment can be described with reference to FIG. 4. Portions of a Fact table 404 are stored on each node 402. Full dimension tables 406 are stored on each node, because they are relatively small.

In an embodiment, the first step on the map phase is to use the DAP interface, otherwise knows as the scanner 408, to fetch the raw data. Then, a further step in the map phase is to perform aggregation 410 locally on node 402. For example, a process may compute revenue per publisher_name on this node. Such partial aggregation results are transferred to the node that performs the reduce job, as discussed hereinbelow.

Figure 4:
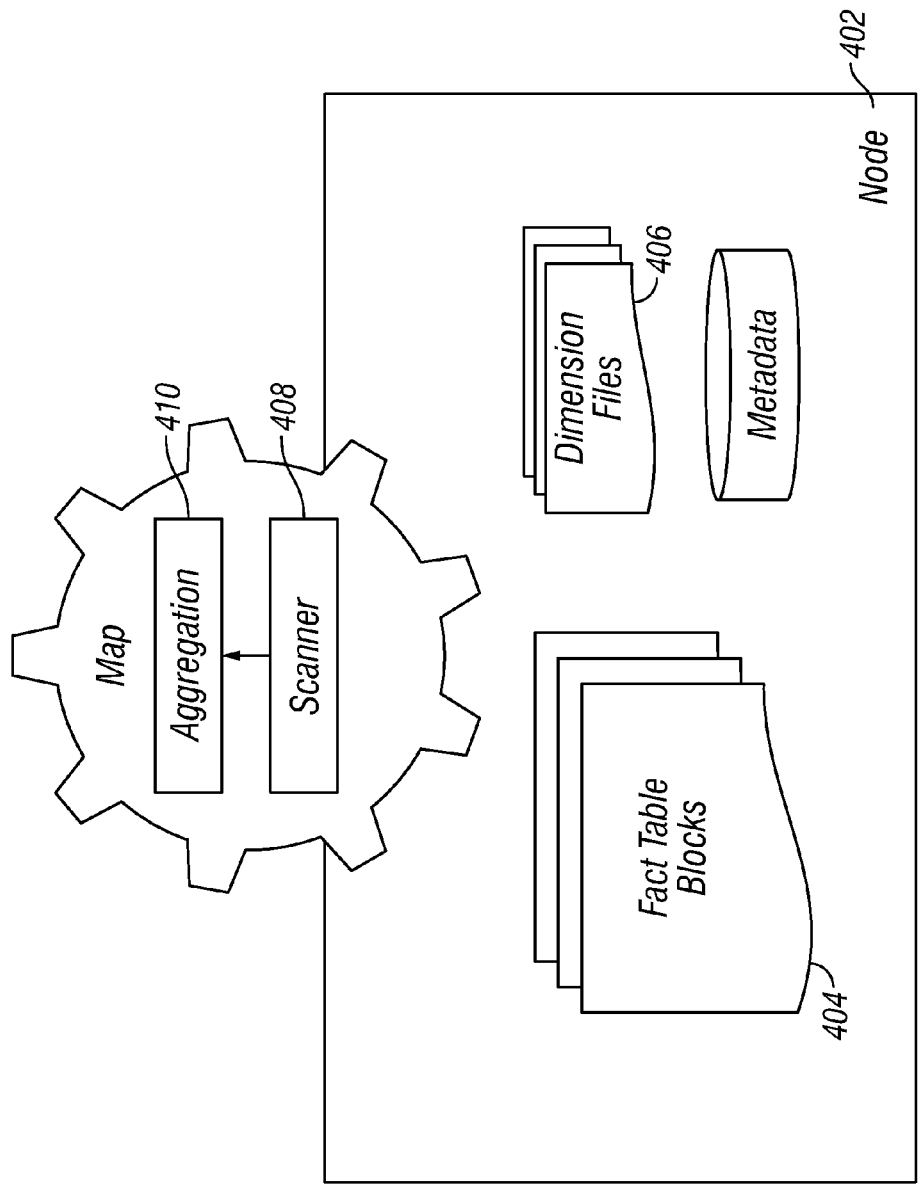
FIG. 4 is a schematic diagram that shows a map phase plan according to an embodiment.

Thus, as can be seen in FIG. 4, each node in the cluster of nodes stores some portion of the Fact table data blocks and (small) dimension files.

The map phase of the query contains two operators, namely, scanner and aggregation. Externally, the scanner operator has an interface which resembles a SELECT/PROJECT operator over the virtual view, as depicted in FIG. 5, a schematic diagram on a scanner interface. That is, a filter condition 502 on the input rows 504 and a list of columns 506 that is of interest as output 508. It should be appreciated that a column can be an expression as well. Output tuples 508 have an iterator interface such that they can be retrieved by a getNext function call. For proper access control, as discussed hereinabove, a user ID and password may be required as well.

Internally, the scanner operator translates the request to an SPJ query to pick up the attributes on the dimension tables. It should be appreciated that only those dimension tables referred in the query need to be accessed and joined. Further, the multi-way join algorithm is used and exploited here because the dimensions to be joined are small. In an embodiment, these dimensions are loaded into an in-memory hash table only once if different map tasks share the same Java Virtual Machine (JVM). Other common optimization techniques, such as selection pushdown, are also contemplated.

The aggregation operator performs a local aggregation of the current block when the aggregate function is algebraic. In an embodiment, a hash-based implementation of group by operator is used.

Reduce Phase Plan

The reduce phase of the query according to an embodiment is straightforward as shown in FIG. 6. FIG. 6 is a schematic diagram showing the reduce phase of query processing according to an embodiment. A node 602 first performs global aggregation 604 over the results from the map phase 606, e.g. partitioned aggregates from the map phase. Node 602 then evaluates any residual expressions over the aggregate values and/or the HAVING clause 608.

Lastly, if the ORDER BY columns are group by columns, then they are already sorted by HaDoop framework during the reduce phase. And, the property is leveraged according to an embodiment. If the ORDER BY columns are the aggregation columns, then, according to an embodiment, the results within each reduce task are sorted and the final results are merged after the particular MapReduce job completes. If in addition there is a LIMIT by n clause, each reduce task only needs to output the top n rows for the final merge.

Query Optimization

It should be appreciated that the query plan described hereinabove is mostly fixed. That is, the shape of the query plan remains unchanged for a majority of the queries. One main reason is that the join ordering problem, which is the center piece of a relational query optimizer, is not much of an issue in an embodiment due to the de-normalization of big dimension tables as described hereinabove. In this section, some unique optimization opportunities are presented that are specific to the virtual view design and MapReduce framework according to an embodiment.

MapReduce Job Configuration

In an embodiment, for a given HaDoop MapReduce job and input files for that job, the number of map tasks is determined by the number of input files and the number of blocks per file. The number of reduce tasks however is supplied by a user and may have a big impact on performance.

When the query output is small, it has been found that the map phase dominates the total cost. Having a large number of reducers may be a waste of resources and may slow down the query as well. However, when the query output is large, it is mandatory to have sufficient number of reducers to partition the work. It should be appreciated that, in an embodiment, small output is considered to be less than 1,000,000 groups and large output is considered to be greater than 1,000,000 groups. Some simple heuristics to address this problem are discussed herein. First, the number of reducers is proportional to the number of group by columns in the query. Second, if the group by column includes some column with very large cardinality, e.g., a URL, we increase the number of reducers as well. It has been found that such heuristics work well for particular queries.

Multi-Query Optimization

Figure 7A:
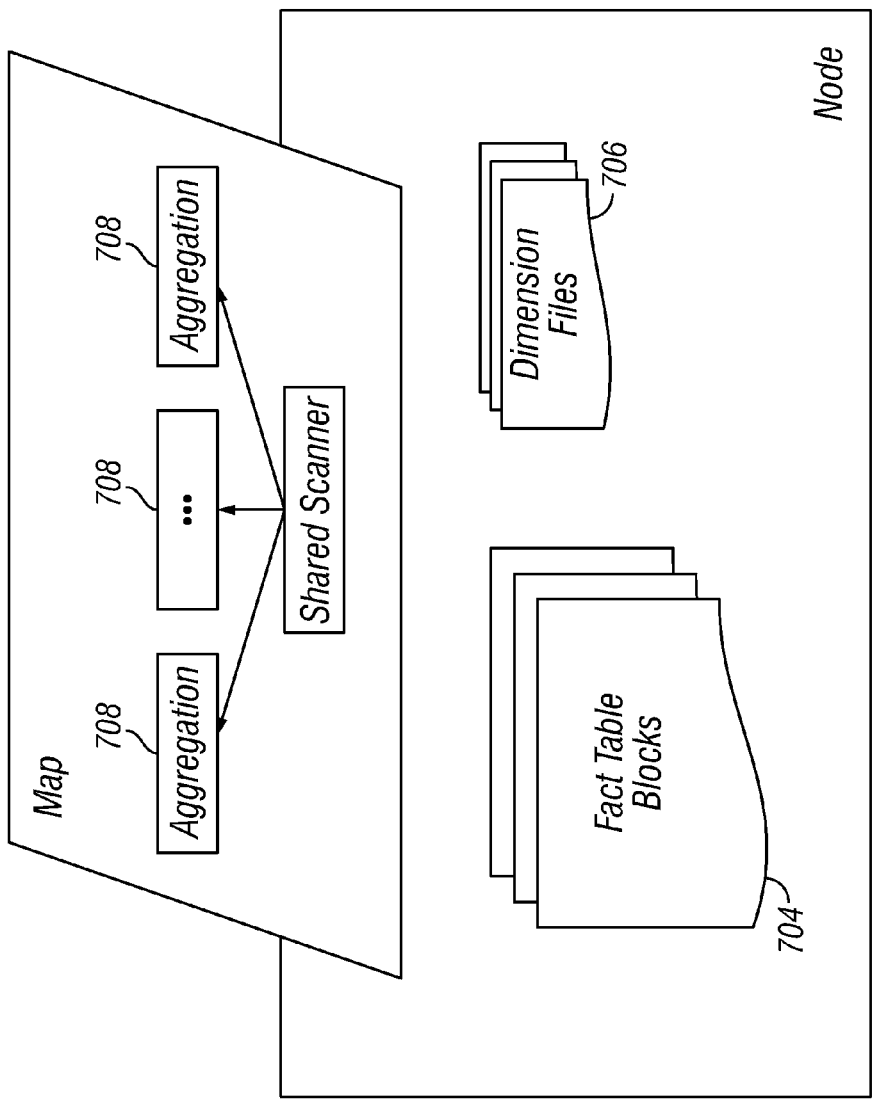
FIG. 7a is a schematic diagram of multi-query processing according to an embodiment.
Figure 7B:
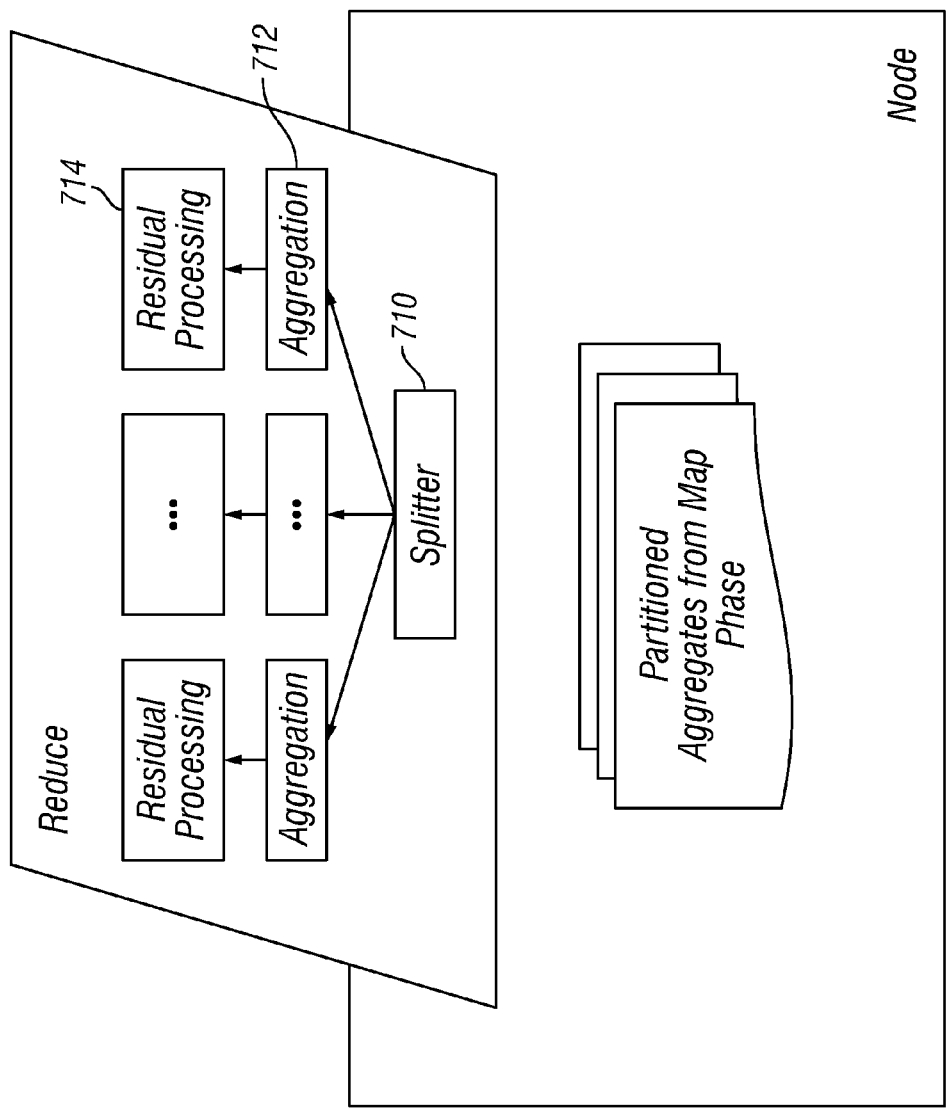
FIG. 7b is a schematic diagram of multi-query processing according to an embodiment.

According to an embodiment, users are allowed to simultaneously submit multiple queries and execute such queries in a single batch, as long as these queries have the same FROM and DATES clauses. For example, the query below can be executed together with the query hereinabove, in section SCHEMA DESIGN, QUERY LANGUAGE:

SELECT publisher_name, sum(impression), sum(click)
    FROM Impressions_v, Clicks_v
    DATES [2010_01_01, 2010_01_15], [2010_02_01, 2010_02_15]
    GROUP BY publisher_name Multi-query processing according to an embodiment, can be described with reference to FIG. 7a and FIG. 7b. As shown in FIG. 7, to execute this combined query, the map phase now has a shared scanner 702, which shares the scan of the Fact tables 704, joins to the dimension tables 706 and performs predicate evaluation if any. Scanner 702 attaches a query ID to each output row, indicating which query this row qualifies. This ID is also used as an additional group by column. Different aggregation operators 708 derive or compute output from the scan of the Fact tables. The output from different aggregation operators 708 are merged into a single output stream. Thus it is important to have the query ID, otherwise the reduce phase is not able to distinguish between the rows for different queries. FIG. 7b shows a schematic diagram of the reduce phase according to an embodiment. The reduce phase first splits, by a splitter processor 710, the input rows based on their query IDs and sends the input rows to the corresponding query operators. FIG. 7b depicts splitter 710 sending input rows to corresponding query operators 712 for aggregation and further to residual processors 714 for residual processing.

It should be appreciated that a query server may find any shared queries automatically. However, it has been found that a job is hard to share once a job is started.

In an embodiment, a virtual view abstraction allows the sharing process to be transparent to users. According to prior art techniques, users have to modify the query to first create a shared temporary table.

Thus, it has been found that this particular technique discussed hereinabove is particularly useful to batch process scheduled queries. Users can also benefit from this technology if they have several queries in mind.

Exploiting Materialized Views

Definition of Materialized Views

In an embodiment, first, each materialized view is defined on one fact table, not on its corresponding virtual view. It is partitioned by date as well. That is, one materialized view partition is created for each fact table partition. Below is a sample materialized view defined on Impression fact table.

CREATE MATERIALIZED VIEW publisher AS
    SELECT publisher_id,
        sum(impression) impression, sum(cost) cost
    FROM Impressions
    GROUP BY publisher_id As is depicted in the sample, first, all three columns referred in the query reside on the fact table, Impressions. In other words, there is no column from dimension table. Second, for simplicity, no filtering condition is included in the WHERE clause to simplify the query matching. It also maximizes the matching possibility.

Then a virtual view is created. Such virtual view is referred to as publisher v. Publisher v resides on top of this materialized view, which joins all related dimension tables. In this particular case, only the publisher dimension is related. The resulting virtual view has two types of columns, namely, the group by columns and the aggregate columns. It should be appreciated that for enhancing understanding purposes, and not to be limiting, such type of resulting virtual view is referred to herein as a materialized view.

View Matching and Query Rewriting

In an embodiment, to make use of a materialized view, two problems are addressed, namely, view matching and query rewriting. The following conditions must be satisfied for a materialized view to match a query.

The query refers to the virtual view that corresponds to the same fact table upon which the materialized view is defined.
    The non-aggregate columns referred to in the SELECT, WHERE, GROUP BY clauses in the query are a subset of the materialized view's group by columns.
    The aggregate columns are computable from the materialized view's aggregate columns.

Hence the view matching task requires simply checking the containment between two sets. For example, the materialized view, publisher v, defined the section, Definition of Materialized Views, matches the query in the section, Multi-Query Optimization. To rewrite this query, the virtual view in the query is replaced with the matching materialized view. Below is the resulting rewritten query.

SELECT publisher_name, sum(impression), sum(click)
    FROM publisher_v, Clicks
    DATES [2010_01_01, 2010_01_20]
    GROUP BY publisher_name At runtime, the partitions of materialized view publisher_v are scanned instead of the Impression table. They are joined with publisher dimension to get the name column.

Low-Latency Query Optimization

It has been found that MapReduce framework itself has some non-trivial overhead which may be significant to small queries. If the optimizer technique in an embodiment detects that the size of the input file is small, e.g. using a materialized view, it may choose to directly read the file from HDFS and perform query processing locally without invoking a MapReduce job. In an embodiment, a file size threshold is determined such that the query can typically finish within 5 seconds. In this way, the query responsiveness is improved as well as the cluster workload is reduced.

Integration

In an embodiment, various ways are provided to connect to a user program. First, the embodiment provides a JDBC interface such that a user program can submit a query and iterate through the output results. Second, if the query results are too big for a single program to consume, a user may write a MapReduce job to analyze the query output files which are stored on HDFS. Lastly, an embodiment can be easily integrated into any ad-hoc MapReduce jobs to access the data at the finest granularity.

Figure 8:
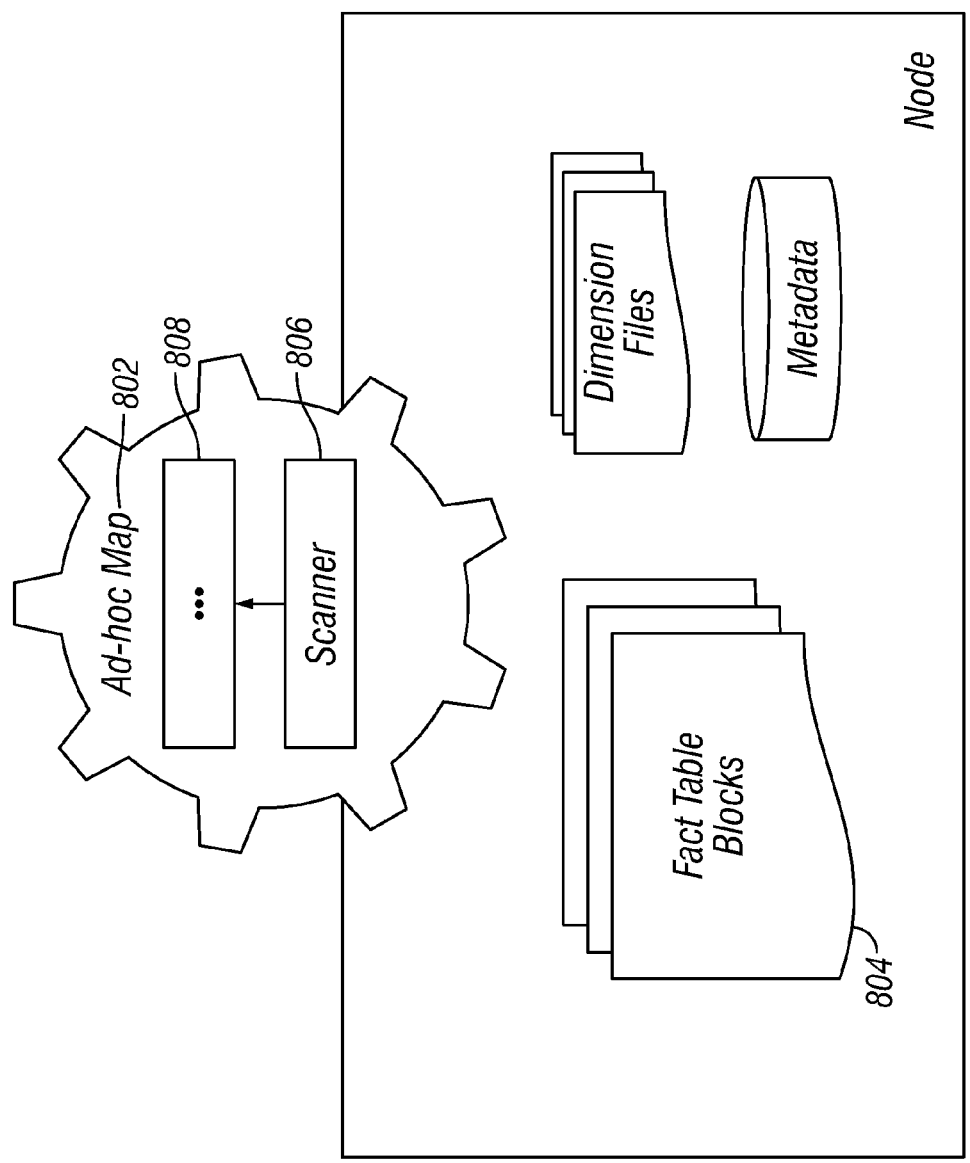
FIG. 8 is a schematic diagram showing integration including ad-hoc programming according to an embodiment.

An embodiment achieving such integration can be described with reference to FIG. 8. The ad-hoc MapReduce program 802 specifies the input files 804, which can be one or more fact table partitions, for example. As well, the MapReduce program includes a scanner 806, such as that described hereinabove, to access individual raw fact table rows 804.

Thereafter, the user has complete freedom to decide what to do with the data. That is, the user may write ad-hoc instructions 808 for acting upon the accessed individual raw table rows.

In an embodiment, two advantages to having this DAP interface open to external applications are achieved. Such embodiment provides ad-hoc MapReduce programs efficient and, significantly, local data access, which means that there is no data moving across different systems or even different nodes. As well, such embodiment greatly hides the underlying schema complexity, e.g. star joins, from MapReduce developers, such that they can solely focus on the application itself. Together, ad-hoc MapReduce programs according to an embodiment can take full advantage of both MapReduce technology, e.g. massive parallelism and scalability, and data warehouse technologies, e.g. easy and efficient data access.

It should further be appreciated that the virtual view-based scanner hides most of the schema complexity from MapReduce developers. That is, they need not to be aware of how to retrieve the columns, what and where the dimension tables are, how to join them, etc. Second, the data is well compressed and the access method is optimized inside the scanner operator. MapReduce developers can now take full advantage of such embodiments without any additional efforts.

Nested Relational Query

Figure 9:
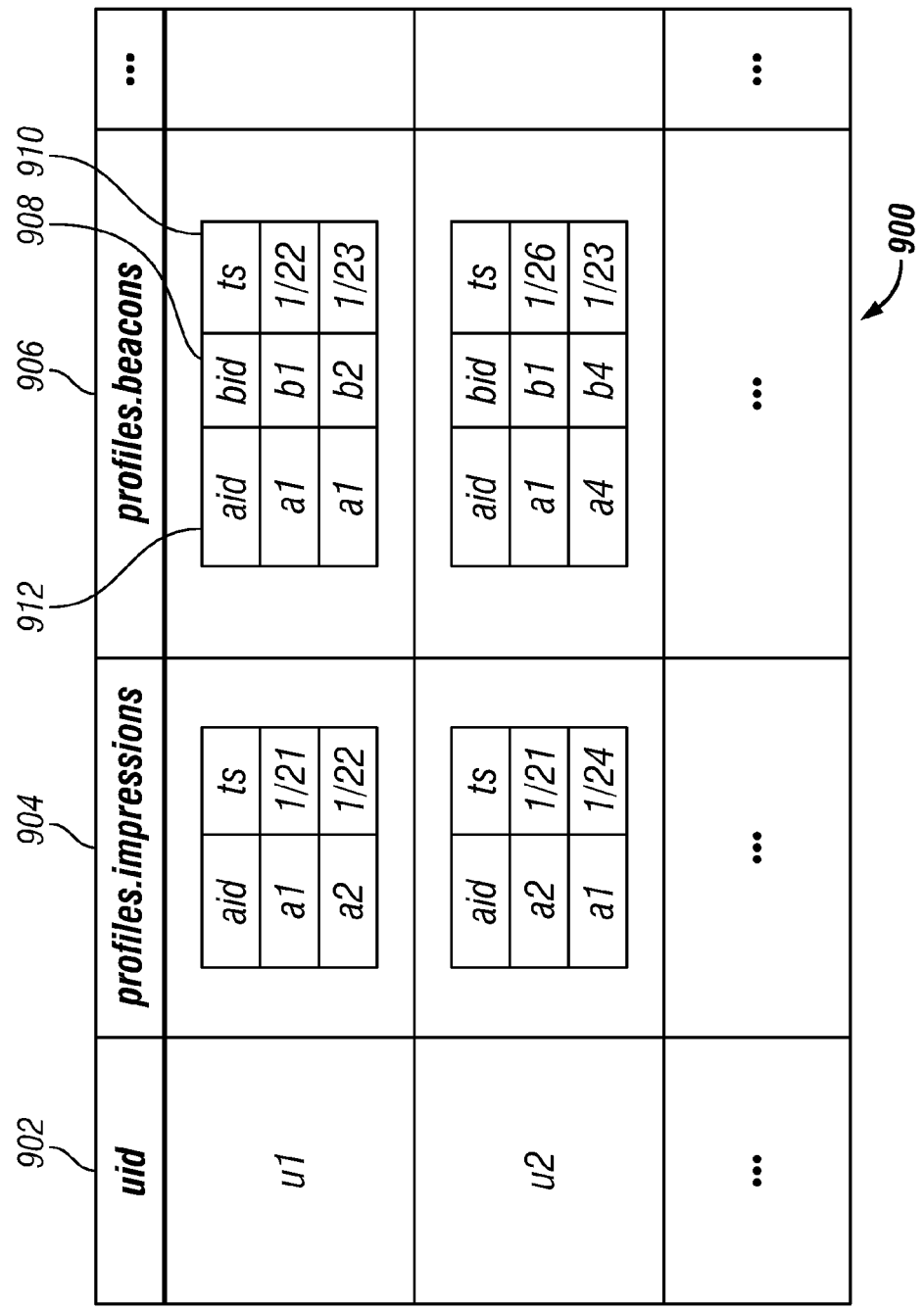
FIG. 9 is a sample table of a user profile having nested tables according to an embodiment.

In an embodiment, a fact table with a nested relational data model, e.g. user profile, is also supported. An example is depicted in FIG. 9, a sample table of a user profile having nested tables. The user profile table 900 is shown to have two types of columns, namely, simple column type such as User ID (uid) 902 and nested table type such as profiles.impressions 904, profiles.beacons 906, etc. In an embodiment, uid 902 is the key for each row. Each nested table stores a specific type of events for that user.

According to the prior art, standard nested relational SQL is quite complex and require users to write many sub-queries. An embodiment provides a more succinct query language while at the same time is sufficient for particular analytics applications.

Basic Operators

An embodiment provides two main operators for querying nested user profile tables, namely, Flatten and Fetch, as described in further detail hereinbelow. It should be appreciated that user profile tables are used by way of example only and are not meant to be limiting.

Flatten

The Flatten operator un-nests the nested tables for each row, e.g. user, and unions the un-nested tables together. For example, Table 1 depicts the results after flattening profiles.impressions 904. Note that the simple columns, such as uid, are also in the flattened table.

TABLE 1

Flattening Profiles.Impressions

| uid | aid | ts |
|---|---|---|
| u1 | a1 | 1/21 |
| u1 | a2 | 1/22 |
| u2 | a2 | 1/21 |
| u2 | a1 | 1/24 |

Fetch

The Fetch operator is defined as: for a given row (user), return the values of one column in the nested table. For example, referring to FIG. 9, profiles.beacons.bid 908 for user u1 gives {b1, b2}, profiles.beacons.ts 910 for u1 gives {1/22, 1/23}. Note that the values in both lists preserve the same tuple order.

A single query may contain one Flatten operator and multiple Fetch operators. Table 2 depicts the results after flattening profiles.impressions nested table 904 and fetching profiles.beacons.aid 912 (shown as p.b.aid) and profiles.beacons.ts 910 (shown as p.b.ts). It should be appreciated that for a single user, the fetched list must remain the same.

TABLE 2

Flattening and Fetching

| uid | aid | ts | p.b.aid | p.b.ts |
|---|---|---|---|---|
| u1 | a1 | 1/21 | {a1, a1} | {1/22, 1/23} |
| u1 | a2 | 1/22 | {a1, a1} | {1/22, 1/23} |
| u2 | a2 | 1/21 | {a1, a4} | {1/26, 1/23} |
| u2 | a1 | 1/24 | {a1, a4} | {1/26, 1/23} |

UDF on Fetched List

It should be appreciated that since the fetched result is a list, it cannot be operated directly with other values, refer to Table 2, for example. In an embodiment, the fetched result is processed by a user-defined function (UDF), which returns a single value. Such UDF conceptually may be equivalent to a subquery over each individual nested table. According to an embodiment, replacing such subqueries with a pre-defined UDF makes the query a lot easier to write and a lot more understandable to a developer, for example.

In an embodiment, each UDF may have more than one input list. According to the embodiment, such lists refer to the same nested table and the values in these lists preserve the same tuple order as mentioned before.

An embodiment provides four UDFs defined as follows.
1) list_has(list1, {value}|col, (list2, {value}|col)*)

The semantics is that if list1 has any value that exists in the constant list {value}, or that equals to the value of a correlated column col, return true. A correlated column is described hereinbelow. Otherwise return false. It should be appreciated that an arbitrary number of conditions can be specified as well. The evaluation model is as follows: get the first value in list1 and in list2, and so on. Check and determine whether all the conditions are satisfied. If so, return true. Otherwise check the second value in each list. For example, the UDF, list_has (profiles.impressions.aid, a1, profiles.impressions.ts, 1/21) returns true for u1, while returns false for u2.
2) max((list1, {value}|col)*, target_list)

The semantics is to find the maximum value of target_list. Optionally, an embodiment allows adding several filter conditions as shown before. For example, max(profiles.beacons.ts)=1/26 for u2. After adding a predicate, max(profiles.beacons.aid, a4, profiles.beacons.ts)=1/23 for u2.
3) min((list1, {value}|col)*, target_list)

Similar to max function, except the minimum value of target_list is sought or found.
4) count between((list1, {value}|col)*, target_list, low, up)

The semantics is to find the number of values in target_list that are within the range of [low, up]. An embodiment allows for optional filer conditions as well.

In an embodiment, such UDFs support arbitrary nesting. They also allow the input parameter to be a column from a flattened table, i.e. the correlated subquery case. For example, in Table 2, list_has(profiles.beacons.aid, aid) means the condition of whether the current aid column from flattened table exists in the profiles.beacons.aid list. The first and the last row in Table 2 satisfy this condition.

In an embodiment, after flattening, fetching, and employing UDFs, relational operators, such as filtering and aggregation on top of those non-list columns, can be applied. For example, in Table 2, an embodiment provides for counting the number of rows that satisfy the predicate ts<min(profiles.beacons.aid, aid, profiles.beacons.ts).

Put Together: Query Language

After illustrating the basic query constructs, we describe the nested query language according to an embodiment can be described via some simple examples below.

SELECT aid, count(distinct uid)
FROM profiles.impressions
WHERE list_has(profiles.beacons.aid, a4)
GROUP BY aid In the first query above, the profiles.impressions table is flattened and profiles.beacons.aid is fetched. The UDF list_has is applied on the fetched list and used as a filtering condition. The final output is (a1, 1) and (a2, 1).

SELECT aid, count(distinct uid),
    sum(distinct case when ts<min(profiles.beacons.aid,
    aid, profiles.beacons.ts) then 1 else 0 end)
FROM profiles.impressions
GROUP BY aid In the second query above, 2 rows (the first and the last) in Table 2 satisfy the case statement. Because they have the same group by column, a1, standard SQL outputs one (1) for the sum distinct column. In the modified semantics according to an embodiment, output is equal to two (2).

Distinct Clause

In an embodiment, the semantics of the DISTINCT clause is modified to help compute the number of unique users. The new semantics according to an embodiment is defined as follows.

Assume a query is to compute group by x and sum(distinct y) from a flattened table. The default SQL semantics will eliminate redundant (x,y) pairs across all users in the flattened table. In other words, it is equivalent to compute group by x and sum(y) from (select distinct x, y from flattened table).

It should be appreciated that modified semantics, according to an embodiment, instead removes redundant (uid, x, y) pairs. In other words, duplicates are removed only within a single user. The new distinct semantics is equivalent to compute group by x and sum(y) from (select distinct uid, x, y from flattened table).

Nested Virtual View

In an embodiment, a nested virtual view on top of the user profile is also created for easy query. That is, for each nested table, all related dimensions similar to those in embodiments discussed hereinabove are joined. For example, according to an embodiment, the view definition includes the join between aid, bid to the corresponding dimension tables. The simple attribute in the user profile table may be joining to some dimension tables as well. Put together, a nested virtual view is achieved.

Query Processing

In an embodiment, the scanner discussed hereinabove is modified to process the nested relational query. In particular, such scanner first un-nests the nested table and evaluates the fetch functions. If any attributes in the dimension table are accessed, the corresponding join is performed as well. The results may be similar to Table 2. Next, any UDFs and/or expressions and/or filtering conditions are evaluated.

An embodiment provides several possible optimizations specific to the nested relational query. First, it should be appreciated that the fetch function is evaluated only once per user. Second, each UDF function is evaluated only once per user, unless it is a correlated UDF. Third, the modified distinct clause removes duplicates per user. Hence the nested query according to an embodiment can be more efficiently processed than by standard methods.

Additionally, multi-query optimization, as discussed hereinabove, over the user profile is supported according to an embodiment. Queries with the same flattened table, e.g. same WHERE clause, can be shared. The shared processing includes the scan of base data, flattening of the nested table, fetching functions, etc.

An Example Machine Overview

Figure 10:
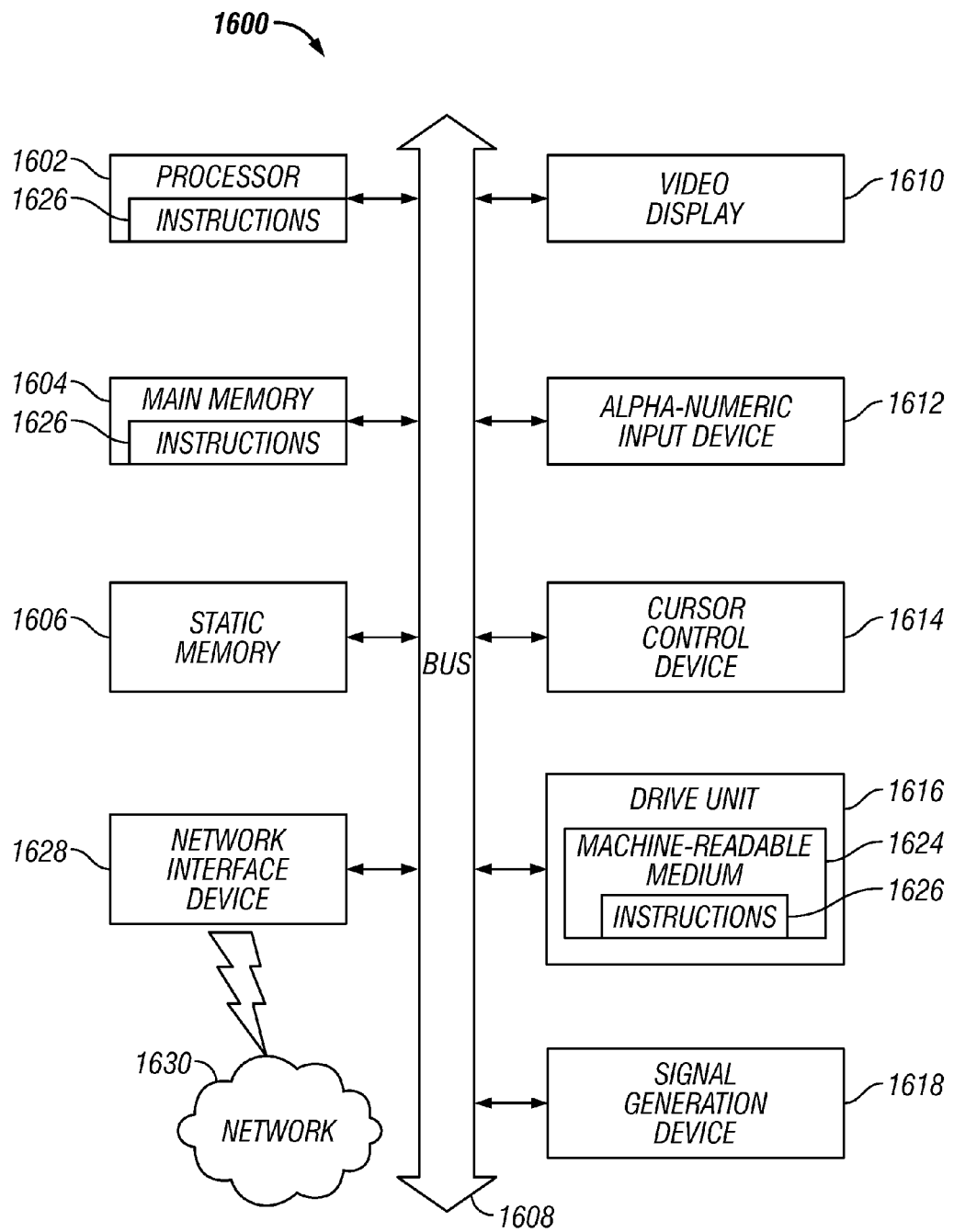
FIG. 10 is a block schematic diagram of a machine in the exemplary form of a computer system within which a set of instructions may be programmed to cause the machine to execute the logic steps according to an embodiment.

FIG. 10 is a block schematic diagram of a machine in the exemplary form of a computer system 1600 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A computer-implemented method for using a data warehouse comprising a cluster of nodes, comprising:
   receiving, by a query processor on a first node of said data warehouse, a particular query, wherein said particular query comprises a DATES clause that specifies date ranges and a FROM clause that specifies at least one virtual view, wherein said at least one virtual view has a nested relational structure and is constructed on the fly by performing a per-node in-memory hash join between one or more partitions of a nested relational fact table and one or more dimension tables;
   translating, by said query processor, said particular query into a corresponding map phase and a corresponding reduce phase, wherein said translating further comprises the steps of:
      determining, by said query processor, one or more fact table partitions based in part on partitioning by the date ranges specified in said particular query; and
      determining and applying particular optimization techniques, based on said particular query;
   at each of said one or more other nodes of said data warehouse, each node having one or more of said fact table partitions and having said one or more dimensions tables, creating the at least one virtual view by joining said one or more fact tables with attributes of any of said one or more dimension tables, said joining based on said particular query, wherein when there are two or more virtual views in the FROM clause, performing a union on all the rows from each individual virtual view and when a specific column referred to in the query does not exist in the view, treat the specific column as a NULL value;
   performing, by a scan processor at said each node of said one or more nodes, a scan over said at least one virtual views based on said particular query and any of said particular optimization techniques;
   performing, by an aggregation processor at said each node of said one or more nodes, local aggregation of said scanned results;
   at a third node of said one or more nodes, performing global aggregation of said local aggregations to generate search results of said particular query for further post-processing; and
   performing a SELECT on particular columns from said one or more fact table partitions and not from any of said dimension tables,
   creating a materialized view by joining results of said SELECT on particular columns with said dimension tables; and
   using said materialized view at run-time when:
      said particular query refers to a virtual view that corresponds to said one or more fact table partitions from which said particular columns were selected;
      non-aggregate columns referenced in SELECT, WHERE, GROUP BY clauses in said particular query are a subset of group by columns of said materialized view; and
      aggregate columns are computable from aggregate columns of said materialized view.

2. The method of claim 1, wherein further post-processing comprises the steps of computing aggregate values based on said scanned results and performing any other residual expressions in said particular query over said aggregate values.

3. The method of claim 1, wherein:
   at least one of said fact table partitions comprises at least one nested table;
   said at least one virtual view is a nested relational virtual view that is created by and used by said scan processor by performing the steps of:
      un-nesting said at least one nested table for each row; and
      performing a union over all such un-nested rows;
      for each row of said union of rows, returning values of at east one column in said at least one nested table; and
      for each row, applying a user-defined function to said returned values to generate a single value result.

4. The method of claim 1, after said performing a scan and before said performing global aggregation, further comprising the step of:
   performing an ad-hoc user program on said scanned results:
   wherein said ad-hoc user program is provided in said particular query; and
   wherein said node comprises a data access primitive (DAP) interface.

5. The method of claim 1, wherein each n rows in said one or more fact table partitions are stored in a cell and wherein a storage format for each cell comprises:
   a header that comprises a schema version and a number of rows in said cell;
   one or more column sets and one or more pointers, each pointer pointing to the beginning of each of said one or more column sets;
   wherein each of said one or more column sets starts with a compression flag indicating any of said compression types:
   dictionary encoding;
   common value encoding;
   run length encoding; and
   no compression.

6. The method of claim 5, wherein said creating at least one virtual view further comprises the step of:
   for each cell, loading said cell in memory and decoding through an iterator interface only column sets of said cell that are referred to in said particular query.

7. The method of claim 1, wherein:
   said query processor receives a batch of a plurality of queries;
   each of said plurality of queries have the same FROM and DATE clauses;
   said scan processor attaches a query ID to each output row that indicates which query of said plurality of queries the row qualifies; and
   wherein said query D is used as an additional group by column.

8. The method of claim 1, wherein if a particular column referenced in said particular query does not exist in said at least one virtual view, assigning said particular column NULL values.

9. An apparatus for using a data warehouse comprising a cluster of nodes, comprising:
means for receiving, by a query processor on a first node of said data warehouse, a particular query, wherein said particular query comprises a DATES clause that specifies date ranges and a FROM clause that specifies at least one virtual view;
means for translating, by said query processor, said particular query into a corresponding map phase and a corresponding reduce phase, wherein said translating further comprises the steps of:
means for determining, by said query processor, one or more fact table partitions based in part on partitioning by the date ranges specified in said particular query; and
means for determining and applying particular optimization techniques, based on said particular query;
at each of said one or more other nodes of said data warehouse, each node having one or more of said fact table partitions and having one or more dimensions tables, means for creating the at least one virtual view by joining said one or more fact tables with attributes of any of said one or more dimension tables, said joining based on said particular query, wherein when there are two or more virtual views in the FROM clause, performing a union on all the rows from each individual virtual view and when a specific column referred to in the query does not exist in the view, treat the specific column as a NULL value;
means for performing, by a scan processor at said each node of said one or more nodes, a scan over said at least one virtual views based on said particular query and any of said particular optimization techniques;
means for performing, by an aggregation processor at said each node of said one or more nodes, local aggregation of said scanned results;
at a third node of said one or more nodes, means for performing global aggregation of said local aggregations to generate search results of said particular query for further post-processing; and
means for performing a SELECT on particular columns from said one or more fact table partitions and not from any of said dimension tables,
means for creating a materialized view by joining results of said SELECT on particular columns with said dimension tables; and
means for using said materialized view at run-time when:
said particular query refers to a virtual view that corresponds to said one or more fact table partitions from which said particular columns were selected;
non-aggregate columns referenced in SELECT, WHERE, GROUP BY clauses in said particular query are a subset of group by columns of said materialized view; and
aggregate columns are computable from aggregate columns of said materialized view.

10. A non-transitory machine-readable storage medium storing one or more sequences of instructions which, when executed by one or more processors, causes the one or more processors to perform:
receiving, by a query processor on a first node of said data warehouse, a particular query, wherein said particular query comprises a DATES clause that specifies date ranges and a FROM clause that specifies at least one virtual view, wherein said at least one virtual view has a nested relational structure and is constructed on the fly by performing a per-node in-memory hash join between one or more partitions of a nested relational fact table and one or more dimension tables;
translating, by said query processor, said particular query into a corresponding map phase and a corresponding reduce phase, wherein said translating further comprises the steps of:
determining, by said query processor, one or more fact table partitions based in part on partitioning by the date ranges specified in said particular query; and
determining and applying particular optimization techniques, based on said particular query;
at each of said one or more other nodes of said data warehouse, each node having one or more of said fact table partitions and having said one or more dimensions tables, creating the at least one virtual view by joining said one or more fact tables with attributes of any of said one or more dimension tables, said joining based on said particular query, wherein when there are two or more virtual views in the FROM clause, performing a union on all the rows from each individual virtual view and when a specific column referred to in the query does not exist in the view, treat the specific column as a NULL value;
performing, by a scan processor at said each node of said one or more nodes, a scan over said at least one virtual views based on said particular query and any of said particular optimization techniques;
performing, by an aggregation processor at said each node of said one or more nodes, local aggregation of said scanned results;
at a third node of said one or more nodes, performing global aggregation of said local aggregations to generate search results of said particular query for further post-processing; and
performing a SELECT on particular columns from said one or more fact table partitions and not from any of said dimension tables,
creating a materialized view by joining results of said SELECT on particular columns with said dimension tables; and
using said materialized view at run-time when:
said particular query refers to a virtual view that corresponds to said one or more fact table partitions from which said particular columns were selected;
non-aggregate columns referenced in SELECT, WHERE, GROUP BY clauses in said particular query are a subset of group by columns of said materialized view; and
aggregate columns are computable from aggregate columns of said materialized view.

11. A non-transitory machine-readable storage medium storing one or more sequences of instructions which, when executed by one or more processors, causes the one or more processors to perform:
wherein further post-processing comprises the steps of computing aggregate values based on said scanned results and performing any other residual expressions in said particular query over said aggregate values.

12. A non-transitory machine-readable storage medium storing one or more sequences of instructions which, when executed by one or more processors, causes the one or more processors to perform:

at least one of said fact table partitions comprises at least one nested table;
said at least one virtual view is a nested relational virtual view that is created by and used by said scan processor by performing the steps of:
un-nesting said at least one nested table for each row; and
performing a union over all such un-nested rows;
for each row of said union of rows, returning values of at least one column in said at least one nested table; and
for each row, applying a user-defined function to said returned values to generate a single value result.

13. A non-transitory machine-readable storage medium storing one or more sequences of instructions which, when executed by one or more processors, causes the one or more processors to perform:
a scan and before said performing global aggregation, further comprising the step of:
performing an ad-hoc user program on said scanned results;
wherein said ad-hoc user program is provided in said particular query; and
wherein said node comprises a data access primitive (DAP) interface.

14. A non-transitory machine-readable storage medium storing one or more sequences of instructions which, when executed by one or more processors, causes the one or more processors to perform:
wherein each n rows in said one or more fact table partitions are stored in a cell and wherein a storage format for each cell comprises:
a header that comprises a schema version and a number of rows in said cell;
one or more column sets and one or more pointers, each pointer pointing to the beginning of each of said one or more column sets;
wherein each of said one or more column sets starts with a compression flag indicating any of said compression types:
dictionary encoding;
common value encoding;
run length encoding; and
no compression.

15. A non-transitory machine-readable storage medium storing one or more sequences of instructions which, when executed by one or more processors, causes the one or more processors to perform:
wherein said creating at least one virtual view further comprises the step of:
for each cell, loading said cell in memory and decoding through an iterator interface only column sets of said cell that are referred to in said particular query.

16. A non-transitory machine-readable storage medium storing one or more sequences of instructions which, when executed by one or more processors, causes the one or more processors to perform:
wherein said creating at least one virtual view further comprises the step of:
for each cell, loading said cell in memory and decoding through an iterator interface only column sets of said cell that are referred to in said particular query.

17. A non-transitory machine-readable storage medium storing one or more sequences of instructions which, when executed by one or more processors, causes the one or more processors to perform:
wherein if a particular column referenced in said particular query does not exist in said at least one virtual view, assigning said particular column NULL values.

18. A computer-implemented method for using a data warehouse comprising a cluster of nodes, comprising the steps of:
receiving, by a query processor on a first node of said data warehouse, a particular query, wherein at least one virtual view having a nested relational structure is constructed on the fly by performing a per-node in-memory hash join between one or more partitions of a nested relational fact table and one or more dimension tables;
translating, by said query processor, said particular query into a corresponding map phase and a corresponding reduce phase, wherein said translating further comprises the steps of:
determining, by said query processor, one or more fact table partitions, based on said particular query; and
determining and applying particular optimization techniques, based on said particular query;
at each of said one or more other nodes of said data warehouse, each node having one or more of said fact table partitions and having said one or more dimensions tables, creating at least one virtual view by joining said one or more fact tables with attributes of any of said one or more dimension tables, said joining based on said particular query;
performing, by a scan processor at said each node of said one or more nodes, a scan over said at least one virtual views based on said particular query and any of said particular optimization techniques;
performing, by an aggregation processor at said each node of said one or more nodes, local aggregation of said scanned results;
at a third node of said one or more nodes, performing global aggregation of said local aggregations to generate search results of said particular query for further post-processing; and
performing a SELECT on particular columns from said one or more fact table partitions and not from any of said dimension tables,
creating a materialized view by joining results of said SELECT on particular columns with said dimension tables; and
using said materialized view at run-time when:
said particular query refers to a virtual view that corresponds to said one or more fact table partitions from which said particular columns were selected;
non-aggregate columns referenced in SELECT, WHERE, GROUP BY clauses in said particular query are a subset of group by columns of said materialized view; and
aggregate columns are computable from aggregate columns of said materialized view.

* * * * *